United States Patent
Brown

(10) Patent No.: US 9,945,643 B2
(45) Date of Patent: Apr. 17, 2018

(54) BALLISTIC RESISTANT VEHICLE TRAY

(71) Applicant: Keith Brown, Walford, IA (US)

(72) Inventor: Keith Brown, Walford, IA (US)

(*) Notice: Subject to any disclaimer, the term of this patent is extended or adjusted under 35 U.S.C. 154(b) by 0 days.

(21) Appl. No.: 15/196,265

(22) Filed: Jun. 29, 2016

(65) Prior Publication Data

US 2018/0003469 A1  Jan. 4, 2018

(51) Int. Cl.
*F41H 7/04* (2006.01)
*B60N 3/04* (2006.01)

(52) U.S. Cl.
CPC ........... *F41H 7/04* (2013.01); *B60N 3/044* (2013.01); *B60N 3/048* (2013.01)

(58) Field of Classification Search
CPC . F41H 7/04; F41H 7/042; F41H 7/046; F41H 7/048; B60N 3/044; B60N 3/048; B60N 30/04
USPC ........... 89/36.02, 36.01, 36.04, 35.05, 36.07; 428/911
See application file for complete search history.

(56) References Cited

U.S. PATENT DOCUMENTS

| | | | |
|---|---|---|---|
| 4,412,495 A * | 11/1983 | Sankar | F41H 5/08 109/49.5 |
| 4,964,666 A | 10/1990 | Dillon | |
| 5,349,893 A | 9/1994 | Dunn | |
| 5,392,686 A * | 2/1995 | Sankar | F41H 5/08 109/49.5 |
| 5,448,938 A | 9/1995 | Fernandez et al. | |
| 5,517,894 A | 5/1996 | Bohne et al. | |
| 5,531,500 A | 7/1996 | Podvin | |
| 5,533,781 A | 7/1996 | Williams | |
| 5,641,934 A | 6/1997 | Follett | |
| 5,679,918 A * | 10/1997 | Korpi | F41H 5/013 109/49.5 |
| 5,811,719 A * | 9/1998 | Madden, Jr. | B60R 21/12 296/146.7 |
| 6,027,781 A * | 2/2000 | Landry | B60N 3/044 296/97.23 |
| 6,807,890 B1 * | 10/2004 | Fuqua | F41H 5/08 89/36.02 |
| 7,114,760 B2 | 10/2006 | Cameron | |
| 7,114,764 B1 | 10/2006 | Barsoum et al. | |
| 7,389,718 B1 | 6/2008 | Carter et al. | |

(Continued)

FOREIGN PATENT DOCUMENTS

| | | |
|---|---|---|
| GB | 2347112 A | 8/2000 |
| GB | 2364956 A | 2/2002 |

(Continued)

*Primary Examiner* — John Cooper
(74) *Attorney, Agent, or Firm* — Zarley Law Firm, P.L.C.

(57) ABSTRACT

The present invention relates to a device and method for providing immediate additional ballistic resistant portable personal protection for first responders, such as Police, Fire, EMS, and military personnel, during an emergency event. The device, configured for insertion into either the driver or passenger interior floor of an emergency vehicle is comprised of a molded shell with layers comprising a ballistic resistant layer that both provides vehicle floor matting and fits seamlessly into the contours of the emergency vehicle foot well and interior floor. For easy removal and immediate use as a directional portable personal protection device, handles are provided on the shell such that the handles do not interfere with driving.

15 Claims, 3 Drawing Sheets

(56) References Cited

U.S. PATENT DOCUMENTS

| | | | |
|---|---|---|---|
| 7,424,844 B2 | 9/2008 | Carter | |
| 8,109,557 B1* | 2/2012 | Salinas | F41H 5/16 280/770 |
| 8,210,088 B1* | 7/2012 | Keyfauver | F41H 5/08 89/36.05 |
| 8,267,459 B2* | 9/2012 | MacNeil | B60N 3/044 296/75 |
| 8,739,312 B1 | 6/2014 | Brown et al. | |
| 9,038,523 B2* | 5/2015 | Rasico | F41H 7/042 280/784 |
| 2002/0092416 A1* | 7/2002 | Cohen | F41H 5/06 89/36.05 |
| 2005/0257678 A1* | 11/2005 | Camp | F41C 33/06 89/36.07 |
| 2006/0091695 A1* | 5/2006 | MacNeil | B29C 47/0021 296/97.23 |
| 2008/0047419 A1* | 2/2008 | Thompson | F41H 5/08 89/36.02 |
| 2010/0251883 A1* | 10/2010 | Naroditsky | B60N 2/4242 89/36.02 |
| 2010/0251884 A1* | 10/2010 | Floch | F41H 5/013 89/36.08 |
| 2014/0165270 A1* | 6/2014 | Gaynor | F41H 5/08 2/455 |
| 2014/0182449 A1* | 7/2014 | Mears | F41H 7/042 89/36.08 |
| 2015/0217666 A1* | 8/2015 | Garbarino | B60N 3/046 428/100 |
| 2015/0233679 A1* | 8/2015 | Seabrook | F41H 5/08 89/36.07 |
| 2015/0268008 A1* | 9/2015 | Dorsch | F41H 7/042 89/36.08 |
| 2015/0268009 A1* | 9/2015 | Tunis, III | B43L 1/00 89/36.02 |
| 2016/0290770 A1* | 10/2016 | Martinez | F41H 5/08 |
| 2017/0023334 A1* | 1/2017 | Banducci | F41H 5/08 |

FOREIGN PATENT DOCUMENTS

| | | | | |
|---|---|---|---|---|
| GB | 2421298 A | * | 6/2006 | F41H 1/00 |
| GB | 2421298 A | * | 6/2006 | F41H 1/00 |

* cited by examiner

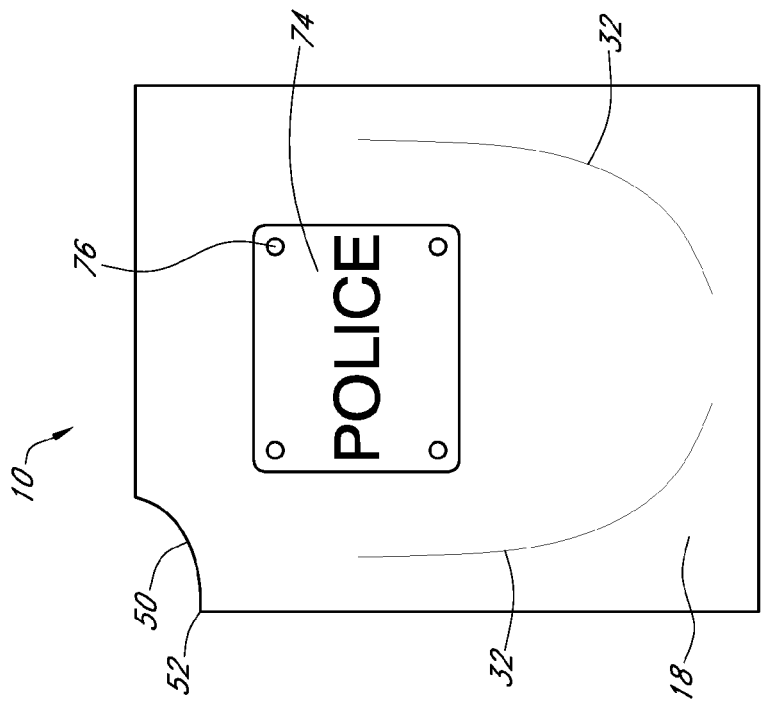
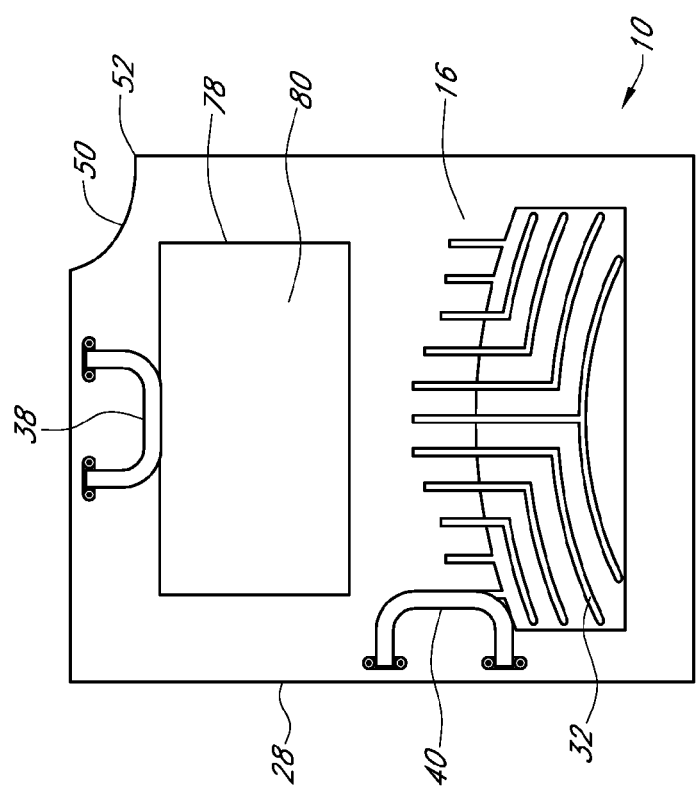
FIG. 1A
FIG. 1B

BALLISTIC RESISTANT VEHICLE TRAY

BACKGROUND OF THE INVENTION

This invention is directed toward a portable, directional, ballistic resistant vehicle tray for personal protection. More specifically, and without limitation, this invention relates to a multi-layer, molded ballistic resistant vehicle tray that is configured to operate as a durable interior floor mat in vehicles and in emergency situations which is immediately and easily accessed for use as a tactical personal protection device.

With the rising levels of terroristic events, school and office campus emergencies, general levels of gun violence, and readily accessible firearms such as handguns, rifles, and similar weaponry, first responder personnel to such events are frequently exposed to great danger from shootings, stabbings, injury due to projection of blunt force objects, assaults, and attacks from both known and unknown threats as they carry out their daily duties. According to a Federal Bureau of Investigation statistical analysis, there was an increase of law enforcement deaths of almost eighty-nine percent within just one year. Within that same year, out of forty-one law enforcement deaths, thirty-eight resulted from firearms.

Many first responders often remain in a defensive location while under gunfire or similar threat while waiting for a SWAT team or other agency to arrive to offensively address the emergency. Alongside the rise in violence, there is also an increased expectation for first responder personnel to engage a threat immediately to reduce fatalities. This expectation, however, has not been accompanied by additional personal protection for the first responders.

Portable personal protective devices for first responders are well known in the art. One advancement that has taken place is a wearable protective device commonly known as a bullet proof vest. This design, however, has its deficiencies. Bullet proof vests are non-directional, are not used by all personnel, and do not cover the entire body for needed protection. Also, personnel do not always wear vests at all times because the vests may be bulky, heavy, limit the range of motion, and are hot. As such, they are not immediately available in emergency situations.

One solution to this problem, however, is either a portable hand held shield or ground level staged shield, or "wall." Similarly, ballistic resistant attachments for vehicle doors have been suggested in the art.

Despite these advances and others, problems still remain. In particular, emergency events require quick action and many advancements require various steps to access and utilize the protective device. Additionally, many current devices do not provide a personal protective device that is dual purpose within a vehicle that can also be used offensively during a tactically complicated situation.

Thus it is a primary objective of this invention to provide a portable personal protection device for first responder personnel that improves upon the current state of the art.

Another objective of this invention is to provide a ballistic resistant vehicle tray that can be used as a both a durable floor tray and a portable directional personal protection device.

Yet another objective of this invention is to provide a ballistic resistant vehicle tray that is seamlessly integrated into existing emergency military, medical services, and police vehicles.

Another objective of this invention is to provide a ballistic resistant vehicle tray that accommodates both drivers and passengers of emergency response vehicles.

Yet another objective of this invention is to provide a ballistic resistant vehicle tray that is within close proximity to first responder personnel for quick removal upon exiting the vehicle.

Another objective of this invention is to provide a ballistic resistant vehicle tray that can provide tactical support enabling a first responder to actively engage a threat.

Yet another objective of this invention is to provide a ballistic resistant vehicle tray that withstands multiple rounds during up to a threat level IV event.

Another objective of this invention is to provide a ballistic resistant vehicle tray that is cost effective.

These and other objectives, features, and advantages of the invention will become apparent from the specification and claims.

BRIEF DESCRIPTION OF THE DRAWINGS

FIG. 1a is a front view of a ballistic resistant vehicle tray;
FIG. 1b is a back view of a ballistic resistant vehicle tray.

SUMMARY OF THE INVENTION

Figure 2:
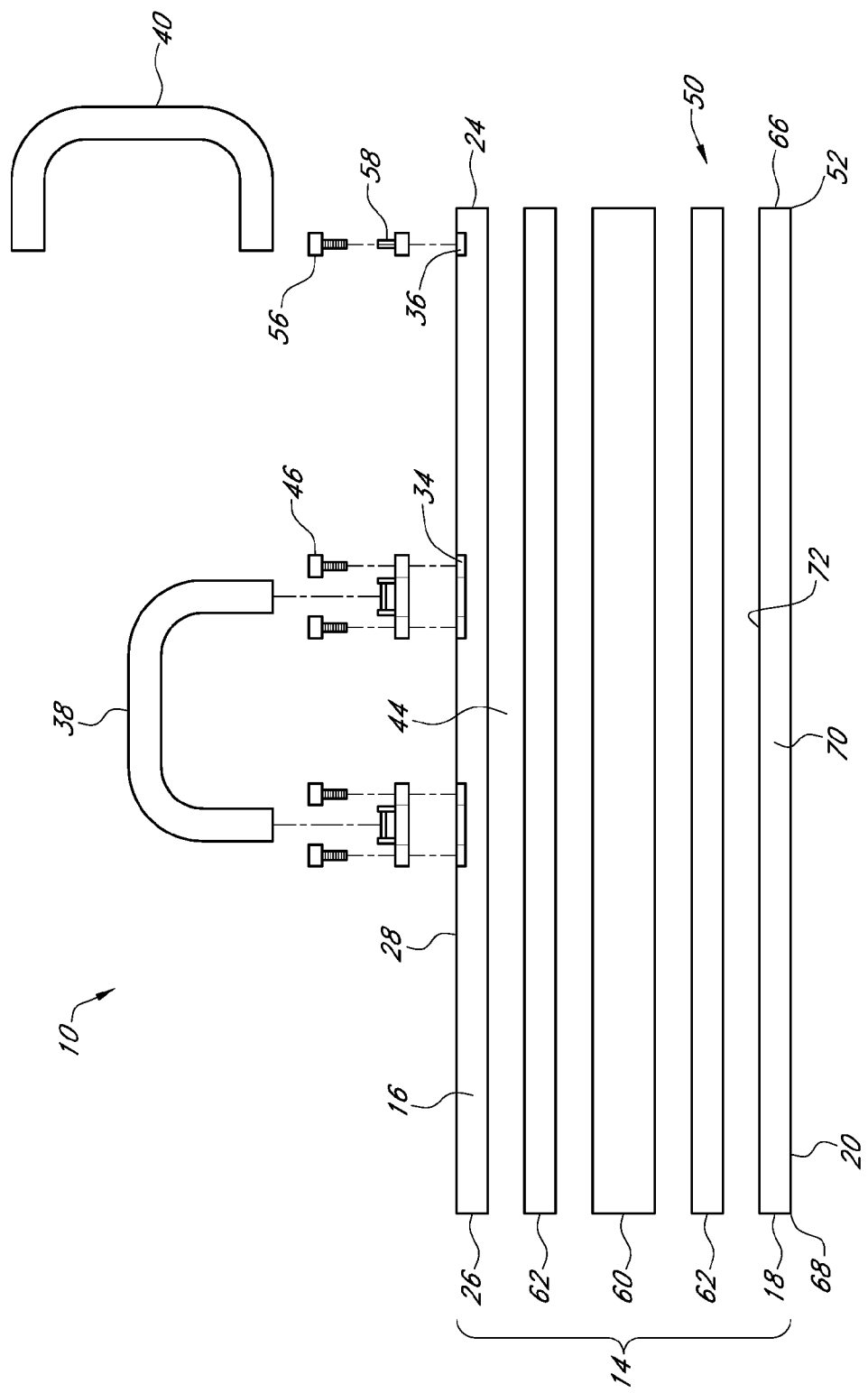
FIG. 2 is an exploded perspective view of a ballistic resistant vehicle tray.

In general, the invention relates to a ballistic resistant vehicle tray system 10 positioned within close proximity to the user and seamlessly positioned to engage the interior flooring of the vehicle. The ballistic resistant vehicle tray system includes a shell having a rigid molded top layer and rigid molded bottom layer with a ballistic resistant layer positioned within the shell. The invention further includes first and second handles rotatably connected by connection members to the top layer of the shell and positioned such that the first handle provides for easy removal from a vehicle, and the second handle provides for immediate directional use as a portable personal protection device. The first and second handles are also positioned on the top layer such that the first and second handles lie flush with the top layer. The invention may include an opening extending through each layer of the shell that receives a ballistic resistant viewing window. The invention may also include identification indicia that can be either removably attached or permanently affixed to the bottom layer of the shell by attachment members.

DETAILED DESCRIPTION

For the purpose of the specification and the claims:
The terms "terroristic", "emergency" and "violent threat" event refers to occurrences involving known or unknown violent acts or acts dangerous to human life that are in violation of the criminal laws of the United States or of any State, events requiring an immediate response from emergency personnel such as police, EMS, or soldiers, acts involving civilian or governmental population intimidation or coercion requiring immediate response from emergency personnel, an assassination or assassination attempt, kidnapping, and other general violent events where gunfire or explosives are used during the assault.

The term "ballistic resistant" refers to materials that are resistant to at least one round of either high power and lower power weaponry including but not limited to rifles and handguns up to a level IV threat.

The term "close proximity" refers to the location of the invention in relation to a user where the invention is located within the user's reach without exiting the vehicle.

With reference to the Figures, a portable ballistic resistant vehicle tray system 10 is shown positioned within a vehicle 12 and having a durable shell 14 having a molded top layer 16 and molded bottom layer 18. The shell 14 may be comprised of any weather resistant, durable materials that provide for easy cleaning and are of a light weight. The molded top layer 16 and molded bottom layer 18 are, in one arrangement, connected along and outer edge 20 to form the shell 14. In one embodiment, the shell is equal to or less than three-quarters of an inch thick.

The molded top layer 16 is rigidly molded generally concave to seamlessly accommodate the contour of a user's feet and an interior foot well of a vehicle 22. The molded top layer 16 has a top end 24, a bottom end 26, a first side 28 and a second side 30. The molded top layer 16 has treading 32 to engage a user's feet and to enable the shell 14 to be used as a floor mat. In one embodiment, the molded top layer 16 has a pair of recesses 34, 36 with a first recess 34 that receives a first handle 38 and a second recess 36 that receives the second handle 40. The recesses 34, 36 are of a depth providing for no interference in driving between a user, at least one pedal 42 of a vehicle 12 and the handles 38, 40.

The first handle 38, in one embodiment, is positioned in close proximity to a user and positioned on the molded top layer 16 near the first side 28 of the molded top layer 16 such that the first handle 38 does not interfere with a user's foot or vehicle pedals 42 and such that the tray system 10 may be easily removed from the vehicle 12 for immediate use as a portable personal protection device. In one embodiment, a first handle 38, may be located at a midpoint 44 between the top end 24 and bottom end 26 of the molded top layer 16. In the present invention, the first handle 38 is rotatably connected to the shell 14 by a plurality of connection members 46 that extend through the tray system 10 via a plurality of apertures 48 in the tray system 10. In one embodiment, the first handle 38 provides for gripping and manipulating the system 10 in order to immediately and quickly remove the system 10 from a vehicle 12.

Also in the as shown in FIG. 2, a second handle 40 is positioned on the molded top layer 16 adjacent a notch 50 that is positioned adjacent a corner 52 of the system 10. The notch 50 is positioned such that a user may place a weapon 54 (not shown) on notch 50 and return gunfire. The present invention anticipates that the notch 50 may be positioned throughout the system 10 for use as an effective offensive tactical weapon support. Further, the second handle 40 is positioned adjacent the top end 24 such that the second handle 40 lies flush with the molded top layer 16 and does not interfere with the vehicle foot pedals 42 or impede a user driving the vehicle 12. In one embodiment, the second handle 40 is positioned adjacent the top end 24 such that a user may immediately manipulate the tray system 10 as a directional portable personal protective device upon encountering a known or unknown threat and to actively engage such threat. The second handle 40, in one embodiment, is rotatably connected to the shell 14 by a plurality of connection members 56 which extend through the system 10 via a plurality of apertures 58 within the system 10.

As shown in FIG. 2, below the molded top layer 16 and positioned within the shell 14, is a ballistic resistant layer 60. The ballistic resistant layer 60 may be comprised of light weight, cost effective ballistic resistant materials such as gels, Kevlar, polymers, fiberglass, and the like that can withstand threat level IV assaults such as multiple ammunition rounds from handguns, rifles, and blast cannons and the like. In one embodiment, a cloth pocket 62, sealed at its ends, encloses the ballistic resistant layer 60 between the molded top layer 16 and the molded bottom layer 18.

Figure 3:
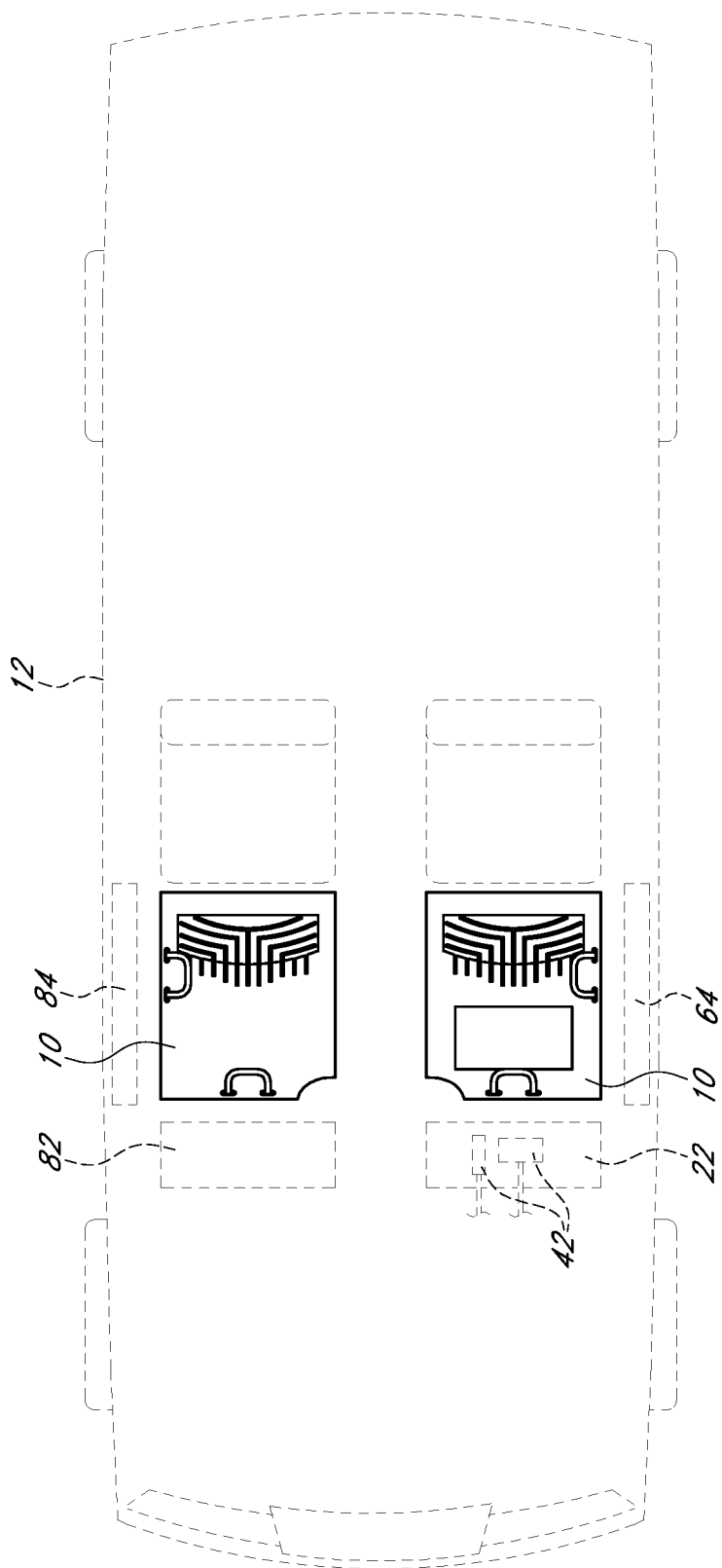
FIG. 3 is a perspective view of a ballistic resistant vehicle tray positioned within a vehicle.

The molded bottom layer 18 is rigidly molded generally concave to seamlessly form to the contour of an interior floor well of a vehicle 22 and to directly engage the floor of a vehicle 64 as shown in FIG. 3. The bottom layer 18 has a top end 66, a bottom end 68, a first side 70, and a second side 72. The bottom layer 18 may be comprised of durable, soil and water resistant materials that provide easy cleaning and are of a light weight. In the present invention, bottom layer is a heavy duty plastic and rubber mixture. In one embodiment, as shown in FIG. 1b, the bottom layer 18 has identification indicia 74 connected positioned adjacent the middle of the shell 14 via attachment members 76. The attachment members 76 may be temporarily or permanently affixed to the molded bottom layer 18 and may be comprised of Velcro, glue, snaps, buttons, tape, string, screws, or the like. In another embodiment, the indicia may be directly written on the molded bottom layer 18 or embossed upon the molded bottom layer 18. In yet another embodiment, as shown in FIG. 1a, the shell 14 has an opening 78 extending through and positioned adjacent the middle of the shell 14 that receives a bullet resistant transparent viewing window 80. In another embodiment, the opening 78 with the bullet resistant transparent viewing window 80 is positioned such that identification indicia 74 may be attached to the shell 14 either above or below the window 80.

In the present invention, the portable ballistic resistant vehicle tray system 10 is configured to accommodate a foot well 22 and floor 64 contour as well as accommodate a user's use of the system 10 by positioning the handles 38, 40 in positions easily accessed by the user while not interfering with driving. The present invention may also be configured substantially the same as the user side arrangement but certain features such as the notch 50, first and second handles 38, 40 and molded top and bottom layers 16, 18 are positioned such that a passenger's use is accommodated for. In this embodiment, the molded top and bottom layers 16, 18 are molded to the contours of a passenger's vehicle foot well 82 and floor 84. This provides the unique benefit of placing the invention in close proximity to both the driver and at least one passenger when engaging a threat in order to access additional protection without exiting the vehicle.

In operation, a portable ballistic resistant vehicle tray system 10 is provided with a ballistic resistant layer 60 encased within a shell 14. The tray system 10 is inserted into a vehicle 12 such that the molded bottom layer 18 of the tray system 10 engages the contouring of a vehicle floor 64. Using a first handle 38 positioned on a first side 28 of a molded top layer 16 of the tray 10, a user may quickly remove the tray 10 from the vehicle 12. Using a second handle 40, a user may immediately hold the tray 10 as a portable directional personal protective device interposed between a user and a threat. A user may then maneuver the tray 10 offensively and directionally toward a threat in order to engage in an immediate tactical response. In the present invention, the system 10 is located in close proximity to the user and is of a size such that the majority of the user's body is protected.

Therefore, a ballistic resistant vehicle tray system 10 has been provided that provides a lightweight, cost effective, portable directional personal protection device, and improves upon the art.

From the above discussion and accompanying Figures and claims it will be appreciated that the ballistic resistant vehicle tray 10 offers many advantages over the prior art. It will be appreciated further by those skilled in the art that other various modification could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed:

1. A portable ballistic resistant vehicle tray system comprising:
   a shell having a rigidly molded top layer and a rigidly molded bottom layer connected along an outer edge;
   a ballistic resistant layer positioned within the shell; and
   first and second handles rotatably connected to the top layer by a plurality of connection members extending through apertures in the shell;
   a pair of recesses positioned on the molded top layer and configured to receive the first and second handles such that when the handles are in a folded position, the handles are flush with the molded top layer.

2. The portable ballistic vehicle tray system of claim 1 wherein the top layer has treading.

3. The shell of claim 1 further comprising a notch positioned adjacent a corner of the shell and configured to receive a weapon.

4. The portable ballistic resistant vehicle tray system of claim 1 further comprising a sealed cloth pocket encasing the ballistic resistant layer within the shell.

5. The portable ballistic resistant vehicle tray system of claim 1 wherein the shell is comprised of durable weather resistant materials.

6. The portable ballistic resistant vehicle tray of claim 1 wherein the first handle is positioned adjacent to the vehicle door.

7. The portable ballistic resistant vehicle tray system of claim 1 wherein the handles are configured to be accessible from a seated position.

8. The portable ballistic resistant vehicle tray system of claim 1 further comprising an opening that receives a bullet proof viewing window.

9. The portable ballistic resistant vehicle tray system of claim 1 wherein identification indicia is attached to the bottom layer by a plurality of attachment members.

10. A portable ballistic resistant vehicle tray system comprising:
    a shell having a rigidly molded top layer and a rigidly molded bottom layer connected along an outer edge;
    wherein the top rigidly molded layer is generally concave and seamlessly receives a contour an interior vehicle foot well;
    wherein the bottom rigidly molded layer is generally concave to seamlessly receive a contour an interior vehicle floor;
    a ballistic resistant layer positioned within the shell; and
    first and second handles rotatably connected to the top layer by a plurality of connection members extending through apertures in the shell;
    a pair of recesses positioned on the molded top layer and configured to receive the first and second handles such that when the handles are in a folded position, the handles are flush with the molded top layer.

11. The portable ballistic resistant vehicle tray system of claim 10 wherein the rigidly molded bottom layer directly engages the interior vehicle floor.

12. The portable ballistic resistant vehicle tray system of claim 10 wherein the ballistic resistant layer withstands threat level IV assaults such that the ballistic resistant layer is protective after multiple ammunition rounds have struck the system.

13. The portable ballistic resistant vehicle tray of claim 10 further comprising a sealed cloth pocket encasing the ballistic resistant layer within the shell.

14. The portable ballistic resistant vehicle tray of claim 10 wherein the handles are configured to be accessible from a seated position.

15. The portable ballistic resistant vehicle tray of claim 10 wherein the first handle is positioned adjacent to the vehicle door.

* * * * *